United States Patent
Korya et al.

(10) Patent No.: US 10,087,968 B2
(45) Date of Patent: Oct. 2, 2018

(54) METALLIC-COMPOSITE JOINT

(71) Applicant: AIRBUS OPERATIONS LIMITED, Bristol (GB)

(72) Inventors: Chetan Korya, Bristol (GB); David Brakes, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 67 days.

(21) Appl. No.: 14/966,764

(22) Filed: Dec. 11, 2015

(65) Prior Publication Data

US 2016/0177995 A1   Jun. 23, 2016

(30) Foreign Application Priority Data

Dec. 19, 2014   (GB) .................................. 1422842.3

(51) Int. Cl.
*F16B 19/06* (2006.01)
*B29C 70/02* (2006.01)
(Continued)

(52) U.S. Cl.
CPC ............ *F16B 19/06* (2013.01); *B29C 65/562* (2013.01); *B29C 65/564* (2013.01); *B29C 65/64* (2013.01);
(Continued)

(58) Field of Classification Search
CPC .. B21J 15/08; B21J 15/02; B21J 15/04; Y10T 29/49801; Y10T 29/49943;
(Continued)

(56) References Cited

U.S. PATENT DOCUMENTS 3,438,302 A     4/1969  Sandor
3,634,928 A  *  1/1972  Falcioni ................... B21J 15/02
                                                           29/243.53
(Continued)

FOREIGN PATENT DOCUMENTS

EP     2372175 A1    10/2011
EP     2698224 A1    2/2014
(Continued)

OTHER PUBLICATIONS

European Search Report dated Apr. 28, 2016 EP Application No. 15200714.
(Continued)

*Primary Examiner* — Ryan J Walters
*Assistant Examiner* — Lawrence Averick
(74) *Attorney, Agent, or Firm* — Nixon & Vanderhye P.C.

(57) ABSTRACT

The invention provides a method of manufacturing a metallic-composite joint comprising a metallic component having one hole in a surface thereof, and a metallic fastener having a head portion for attaching to the metallic component and a tail portion for attaching to a composite component, comprising the steps of positioning the metallic fastener such that the head portion of the metallic fastener is retained in the hole, and the tail portion of the metallic fastener extends out of the hole, arranging layered fibers of an uncured composite component on the surface of the metallic component such that the tail portion extends through a gap between adjacent fibers in each fiber layer, and curing the composite component. The invention also provides a metallic-composite joint, a structure, an aircraft structure, an aircraft, a method of manufacturing a fastener assembly, a fastener assembly and a metallic fastener.

19 Claims, 8 Drawing Sheets

(51) Int. Cl.
  *B29C 70/78* (2006.01)
  *F16B 5/04* (2006.01)
  *B29C 65/00* (2006.01)
  *B29C 65/56* (2006.01)
  *B29C 65/64* (2006.01)
  *B29L 31/30* (2006.01)

(52) U.S. Cl.
  CPC .... *B29C 66/02242* (2013.01); *B29C 66/1122* (2013.01); *B29C 66/45* (2013.01); *B29C 66/721* (2013.01); *B29C 66/73751* (2013.01); *B29C 66/742* (2013.01); *B29C 70/028* (2013.01); *B29C 70/78* (2013.01); *F16B 5/04* (2013.01); *B29C 66/7422* (2013.01); *B29L 2031/3076* (2013.01)

(58) Field of Classification Search
  CPC ...... Y10T 29/49956; F16B 19/06; F16B 5/04; B29C 65/60; B29C 70/028; B29C 70/78; B29C 66/1122; B29C 66/742; B29C 66/73751; B29C 65/562; B29C 66/45; B29C 65/564; B29C 66/02242; B29C 65/64; B29C 66/721; B29C 66/7422; B29C 70/30; B29C 71/02; B29L 2031/3076; B32B 7/08
  USPC ...................... 264/236, 257, 258; 156/91, 92
  See application file for complete search history.

(56) References Cited

U.S. PATENT DOCUMENTS

| | | | | |
|---|---|---|---|---|
| 3,948,427 A * | 4/1976 | Claydon | ................. | B21J 15/02 227/97 |
| 4,109,435 A * | 8/1978 | Loyd | ................. | B29C 65/562 52/309.1 |
| 4,219,980 A * | 9/1980 | Loyd | ................. | B29C 65/561 156/92 |
| 5,314,282 A | 5/1994 | Murphy et al. | | |
| 5,361,483 A * | 11/1994 | Rainville | ............ | B29C 66/7394 29/524.1 |
| 6,325,584 B1 * | 12/2001 | Marko | ................. | B21J 15/025 411/179 |
| 9,023,455 B2 * | 5/2015 | McKelvey Campbell | ................. | B23P 11/00 428/133 |
| 2004/0086328 A1 * | 5/2004 | Babej | .................... | B23P 19/062 403/278 |
| 2005/0220533 A1 | 10/2005 | Prichard | | |
| 2006/0204325 A1 * | 9/2006 | Babej | .................... | B23P 19/062 403/278 |
| 2006/0272143 A1 * | 12/2006 | Kismarton | ........... | B29C 70/202 29/458 |
| 2010/0247869 A1 | 9/2010 | Meyer et al. | | |
| 2011/0227266 A1 | 9/2011 | Midali et al. | | |
| 2012/0045613 A1 * | 2/2012 | Sanderson | ................ | B32B 7/08 428/137 |
| 2013/0000101 A1 * | 1/2013 | Rintelmann | ............ | F16B 19/00 29/525.03 |
| 2013/0075526 A1 | 3/2013 | Griess et al. | | |
| 2013/0248083 A1 * | 9/2013 | Takahashi | .............. | B21J 15/025 156/92 |
| 2013/0336740 A1 | 12/2013 | Druke | | |
| 2013/0340239 A1 * | 12/2013 | Ueda | ..................... | B21J 15/025 29/525.06 |
| 2014/0178152 A1 * | 6/2014 | Carlson | .................. | B21J 15/025 411/501 |
| 2014/0212616 A1 * | 7/2014 | McKelvey Campbell | ................. | B23P 11/00 428/43 |
| 2015/0298241 A1 * | 10/2015 | Graham | ................. | B23K 9/201 219/137 R |
| 2017/0015049 A1 * | 1/2017 | Kittel | .................... | B29C 65/069 |

FOREIGN PATENT DOCUMENTS

| | | |
|---|---|---|
| GB | 2284031 | 5/1995 |
| GB | 2507128 A | 4/2014 |
| GB | 2508142 A | 5/2014 |
| WO | 2009052325 A1 | 4/2009 |
| WO | 2010122325 A1 | 10/2010 |

OTHER PUBLICATIONS

KIPO Search Report dated Jan. 13, 2016 issued in Great Britain Application No. 1422842.3.

* cited by examiner

METALLIC-COMPOSITE JOINT

RELATED APPLICATION

The present application claims priority from Great Britain Application Number 1422842.3, filed Dec. 19, 2014, the disclosure of which is hereby incorporated by reference herein in its entirety.

BACKGROUND OF THE INVENTION

The present invention concerns a method of manufacturing a metallic-composite joint. More particularly, but not exclusively, this invention concerns a method of manufacturing a metallic-composite joint where the metallic-composite joint comprises a metallic component, the metallic component and a metallic fastener, the metallic fastener having ahead portion for attaching to the metallic component and a tail portion for attaching to a composite component.

The invention also concerns a metallic-composite joint, a structure, an aircraft structure, an aircraft, a method of manufacturing a fastener assembly, a fastener assembly and a metallic fastener.

There are various methods of attaching a metallic component to a composite component to form a metallic-composite joint.

One method involves making the surface of the metallic component liquid by heating it to a very high temperature. A metallic spike is then formed extending away from the surface by forming a "proggle". In other words, an implement is contacted with the liquid surface and pulled up away from the surface ("proggling") to form a metallic spike. This spike is made of the same metallic material as the metallic component. The composite component is then attached to the metallic spike (known as a hyper pin) by either laying up fibre layers so that adjacent fibres lie either side of the spike or by shaking the fibre layers onto the spike. The fibre layers are then cured so that the cured composite component is attached to the metallic spike. This process can be time-consuming and expensive.

Another method uses ALM (Additive Layer Manufacturing) to form the metallic spike (hyper pin) on the surface of the metallic component. The composite component can then be attached to the spike, using the two ways described for the earlier method. ALM is also a time-consuming and expensive process. In addition, ALM machines tend to be of a limited size and so can generally only be used to produce smaller pins and so there is a limit to its applicability, especially with large components, For both of these methods, the metallic spike has to be the same material as the metallic component. For example, in aerospace applications, it is often desirable to use an aluminium alloy as the material for the metallic component. However, this then means that, using the methods described earlier, the metallic spike is also made of the aluminium alloy. This can cause problems as aluminium alloy is not readily compatible with composite materials. Hence, so that aluminium alloy and composite materials are prevented from being adjacent to each other, a titanium alloy is used instead for the metallic component. Titanium alloy is more compatible with composite materials so this problem is overcome. However, it is more expensive than aluminium alloy and so is disadvantageous for that reason.

The present invention seeks to mitigate the above-mentioned problems. Alternatively or additionally, the present invention seeks to provide an improved method of manufacturing a metallic-composite joint.

SUMMARY OF THE INVENTION

The present invention provides, according to a first aspect, a method of manufacturing a metallic-composite joint, the metallic-composite joint comprising a metallic component, the metallic component having at least one hole in a surface thereof, and a metallic fastener, the metallic fastener having a head portion for attaching to the metallic component and a tail portion for attaching to a composite component, the method comprising the steps of positioning the metallic fastener such that at least a part of the head portion of the metallic fastener is retained in the hole of the metallic component, and the tail portion of the metallic fastener extends out of the hole and away from the surface of the metallic component, arranging layered fibres of an uncured composite component on the surface of the metallic component such that the tail portion extends through a gap between adjacent fibres in each fibre layer, and curing the composite component, thereby attaching the composite component to the tail portion of the metallic fastener.

Having a metallic component and a non-integral metallic fastener allows the materials of the two metallic elements to be different. This allows the fastener to be made of titanium alloy (so that it can be compatible with extending through the composite component) and the metallic component to be made from aluminium alloy (less ex pensive).

The metallic component may be or may comprise a plate, bracket, flange or tubular end fitting, for example. The metallic component may be generally planar, curved or non-planar, for example.

The composite component is not necessarily placed directly on the metallic component surface. For example, it is noted that, in order to prevent the, for example, carbon fibres of the composite component being adjacent the aluminium alloy (or other material) metallic component, a glass layer can be used in between the composite component and the metallic component. The glass layer may be integral with the (cured) composite component.

The method could include the step of providing the hole in the metallic component. Alternatively, the metallic component may already have the hole present prior to the carrying out of the method.

Preferably, the arranging of the layered fibres comprises the steps of laying up the fibres in layers, then positioning the layers adjacent an end of the tail portion distal from the surface of the metallic component, and then shaking the layers so that the tail portion to passes through the gap in each layer.

Alternatively, the arranging of the layered fibres comprises the step of for each layer, laying up the fibres on the metallic component such that two adjacent fibres pass on substantially opposite sides of the tail portion of the metallic fastener so that the tail portion extends through the layer.

Preferably, either the method further comprises the step of shaping the tail portion or the tail portion of the metallic fastener has already been shaped.

Here, shaped means that the tail portion has been deformed in some way to achieve the desired special shaping. This could be from punching, casting or another type of forming. The shaping may, for example, by provided by reciprocal, cylindrical or compressive forming techniques.

Preferably, the tail portion is or has been shaped to have an outer region, towards the end of the tail portion furthest away from the head portion, and an inner region, towards the end of the tail portion nearest the head portion, wherein the cross-section at the outer region is larger than at the inner region.

The larger outer ref-lion prevents the composite component from being removed over the end of the tail portion. The inner region may make up the majority of the length of the tail portion.

More preferably, the tail portion is or has been shaped to have an intermediate region, in between the inner and outer regions, with a cross-section smaller than the inner region. This means that the intermediate region provides a wasted neck to further prevent the composite component from being removed over the end of the tail portion.

Preferably, the tail portion is or has been shaped so that the end of the tail portion furthest away from the head portion is tapered. This provides a sharp point to aid the tail portion in extending through a gap between adjacent fibres in each fibre layer.

Preferably, either the method further comprises the step of shaping the head portion or the head portion of the metallic fastener has already been shaped.

Here, shaped means that the head portion has been deformed in some way to achieve the desired special shaping. This could be from punching, casting or another type of forming. The shaping may, for example, by provided by reciprocal, cylindrical or compressive forming techniques.

The head portion may be shaped at the same time as the tail portion is shaped. Alternatively, the head portion and the tail portion may be shaped one after the other.

The head portion may be shaped prior to at least a part of the head portion of the metallic fastener being positioned in the hole of the metallic component.

More preferably, the head portion is or has been shaped to have an outer region, towards the end of the head portion furthest away from the tail portion, an inner region, towards the end of the head portion nearest the tail portion, wherein the cross-section at the outer region is larger than at the inner region. The outer region prevents the metallic fastener being positioned too far into the hole of the metallic component. The outer region of the head portion may be removed after the metallic fastener has been positioned.

More preferably, the outer region of the head portion is or has been chamfered to correspond to a chamfered region of the hole in the metallic component. This prevents separation of the metallic component and metallic fastener in a first direction. The outer region of the head portion may be countersunk in the chamfered region of the hole so that the head portion is flush with the metallic component.

Preferably, after the metallic fastener is positioned in the hole of the metallic component, the metallic fastener is shaped to have a securing lip at a junction of the head portion and tail portion, for securing the head portion in the hole. This prevents separation of the metallic component and metallic fastener in a second direction (opposite to the first direction), especially prior to curing of the composite component.

More preferably, the metallic component has a correspondingly shaped recess to accommodate the securing lip.

Preferably, the head portion of the metallic fastener is retained in the hole of the metallic component at least partially by an interference fit. Here, no outer region of the head portion is required. This is especially practical for a joint that is subjected to low tension forces, for example a tubular end fitting where the joint would experience almost solely a shear force.

Preferably, the hole in the metallic component is a through-hole extending through a thickness of the metallic component.

Preferably, the method further includes the step of cutting a wire feed stock to form the metallic fastener, The present invention provides, according to a second aspect, a metallic-composite joint comprising a metallic component having at least one hole in a surface thereof, a composite component having a plurality of fibre layers, a metallic fastener having a head portion attached to the metallic component and a tail portion attached to the composite component, wherein at least part of the head portion is retained in the hole of the metallic component, and wherein the tail portion extends through a gap between adjacent fibres in each fibre layer of the composite component.

The present invention provides, according to a third aspect, a structure comprising the metallic-composite joint as described above. The structure may be any structure where there is a metallic component joined to a composite component. The structure may be for use in sports equipment, such as a bike, boat hulls or wind turbine blades, for example.

The present invention provides, according to a fourth aspect, an aircraft structure comprising he metallic-composite joint as described above.

The present invention provides, according to a fifth aspect, an aircraft comprising the metallic-composite joint as described above.

The present invention provides, according to a sixth aspect, a method of manufacturing a fastener assembly, the fastener assembly comprising a metallic component, the metallic component having at least one hole in a surface thereof, and a metallic fastener, the metallic fastener having a head portion for attaching to the metallic component and a tail portion for attaching to a composite component, the method comprising the steps of positioning the metallic fastener such that at least a part of the head portion of the metallic fastener is retained in the hole of the metallic component, and the tail portion of the metallic fastener extends out of the hole and away from the surface of the metallic component, wherein either the method further comprises the step of shaping the tail portion or the tail portion of the metallic fastener has already been shaped.

Preferably, the tail portion is or has been shaped to have an outer region, towards the end of the tail portion furthest away from the head portion, and an inner towards the end of the tail portion nearest the head portion, wherein the cross-section at the outer region is larger than at the inner region.

More preferably, the tail portion is or has been shaped to have an intermediate region, in between the inner and outer regions, with a cross-section smaller than the inner region.

Preferably, the tail portion is or has been shaped so that the end of the tail portion furthest away from the head portion is tapered.

The present invention provides, according to a seventh aspect, a fastener assembly comprising a metallic component having at least one hole in a surface thereof, a metallic fastener having ahead portion attached to the metallic component and a tail portion for attaching to a composite component, wherein at least part of the head portion is retained in the hole of the metallic component, and wherein the tail portion has been shaped such that either the tail portion has an outer region, towards the end of the tail portion furthest away from the head portion, and an inner region, towards the end of the tail portion nearest the head portion, and wherein the cross-section at the outer region is larger than at the inner region, or the end of the tail portion furthest away from the head portion is tapered.

The present invention provides, according to an eighth aspect, a metallic fastener comprising ahead portion for attaching to metallic component, and a tail portion for attaching to a composite component, wherein the tail portion has been shaped such that either the tail portion has an outer region, towards the end of the tail portion furthest away from the head portion, and an inner region, towards the end of the tail portion nearest the head portion, and wherein the cross-section at the outer region is larger than at the inner region, or the end of the tail portion furthest away from the head portion is tapered.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

FIGS. 1a to 1e show various steps in the process of manufacturing a metallic-composite joint, according to a first embodiment of the invention. The joint comprises a metallic (aluminium alloy) component (a plate 10) and a composite component (not shown), joined together by a metallic (titanium alloy) fastener 20.

Figure 1A:
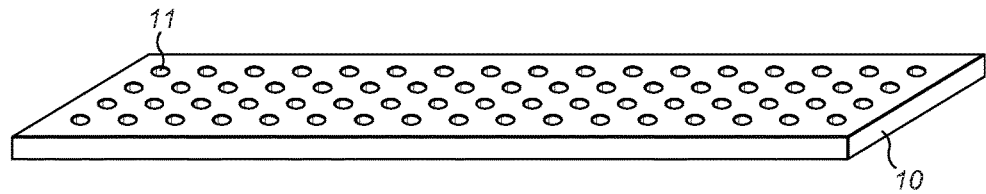
FIG. 1a shows a perspective view of a metallic plate for forming a metallic-composite joint according to a first embodiment of the invention.

Firstly, as shown in FIG. 1a, the plate 10 is drilled with a number of through-holes 11.

Figure 1B:
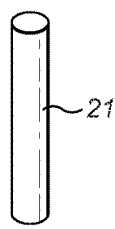
FIG. 1b shows a metallic wire used to form a fastener for the joint.

Secondly, as shown in FIG. 1b, a titanium alloy wire 21 used to form the fastener 20 is provided.

Figure 1C:
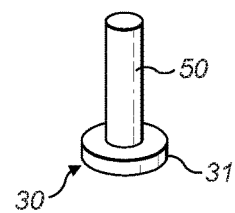
FIG. 1c shows the fastener with a shaped head.

Thirdly, as shown in FIG. 1c, the fastener is provided with a shaped head 30, comprising a disc shape 31, at one end of the wire 21.

Figure 1D:
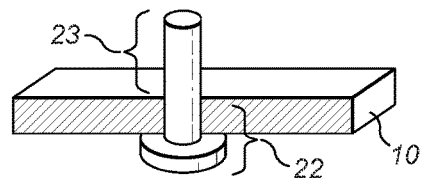
FIG. 1d shows a cut-away view of the fastener placed in a hole of the metallic plate.

Fourthly, as shown in FIG. 1d, the fastener 20 is placed in a hole 11 of the plate 10.

Figure 1E:
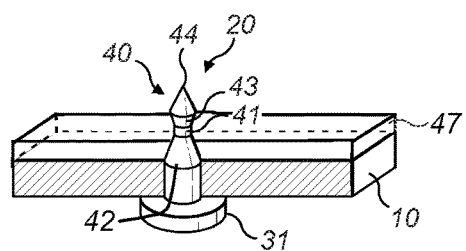
FIG. 1e shows a cut-away view of the fastener in the plate with a shaped tail.

Fifthly, as shown in FIG. 1e, the fastener 20 is provided with a shaped tail. 40 at the opposite end of the wire 21 to the head 30. Hence, the fastener comprises a shaft 50, a shaped head 30 and a shaped tail 40. The shaped tail 40 comprises a narrow neck portion 41 in between two sloping sections 42, 43. It also has a pointed end 44.

Sixthly (not shown), a composite component is placed around the fastener above the plate 10. This can be done either by laying up fibre layers so that adjacent fibres lie either side of the fastener or by shaking the fibre layers onto the fastener (aided by the pointed end 44).

Seventhly (not shown), the fibre layers are then cured so that the cured composite component is attached to the fastener. The neck portion 41 and sloping sections 42, 43 also aid in retaining the composite component on the fastener.

Referring to the parts of the fastener 20 that attach to the different parts of the joint, it can be seen that a head portion 22 (defined by the shaped head 30 and a head end of the shaft 50) attaches to the metallic component (plate 10) and a tail portion. 23 (defined by the shaped tail 40 and a tail end of the shaft 50) attaches to the composite component.

In the following Figures sets (2 to 6) various different methods of forming the joints will be described. Only the differences from the method steps described in relation to FIGS. 1a to 1e) will be described.

Figure 2A:
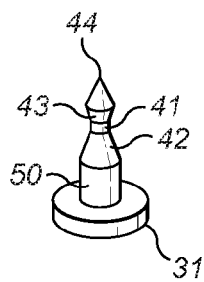
FIG. 2a shows a second fastener with a shaped head and a shaped tail.
Figure 2B:
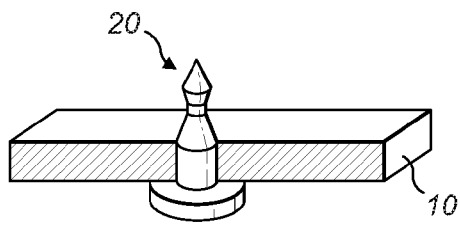
FIG. 2b shows a cut-away view of the fastener placed in a hole of the metallic plate.
Figure 3A:
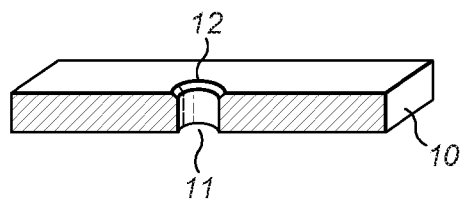
FIG. 3a shows a cut-away view of a hole in the plate provided with a chamfer on the top surface.
Figure 3B:
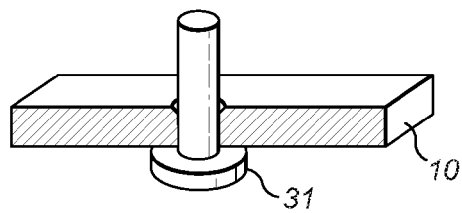
FIG. 3b shows a cut-away view of a fastener with a shaped head in the hole.
Figure 3C:
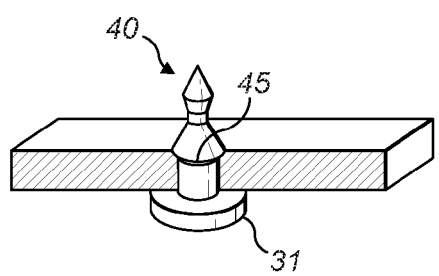
FIG. 3c shows a cut-away view of the fastener with a shaped tail with a lip.

In Figure set 2, the tail is shaped prior to the fastener being placed in the hole (i.e. FIGS. 2a and 2b replace FIGS. 1d and 1e, respectively—steps 4 and 5), In Figure set 3, the hole 11 is provided with a chamfer 12 on the top surface of the plate 10 (see FIG. 3a). When the tail 40 is shaped (with the fastener in the hole 11), the tail includes a lip 45 corresponding to the chamfer 12. This lip 45 retains the plate 10 on the fastener 20. (FIGS. 3a to 3c effectively replace FIGS. 1a, 1d and 1e, respectively—steps 1, 4 and 5.)

Figure 4A:
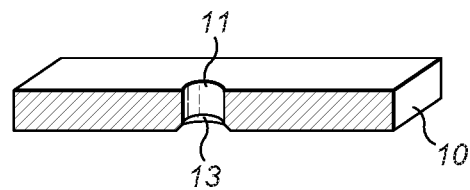
FIG. 4a shows a cut-away view of a hole in the plate provided with a chamfer on the bottom surface.
Figure 4B:
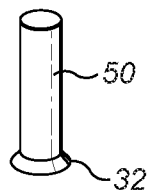
FIG. 4b shows a fastener with a chamfered head.
Figure 4C:
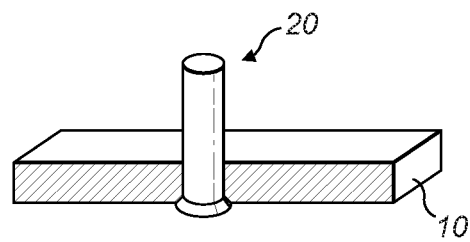
FIG. 4c shows a cut-away view of the fastener with a chamfered head in the hole.
Figure 4D:
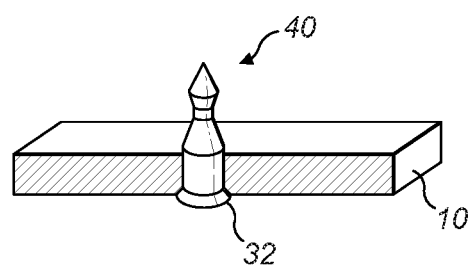
FIG. 4d shows a cut-away view of the fastener with a shaped tail.
Figure 5A:
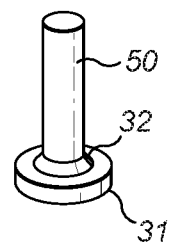
FIG. 5a shows a fastener with a shaped and chamfered head.
Figure 5B:
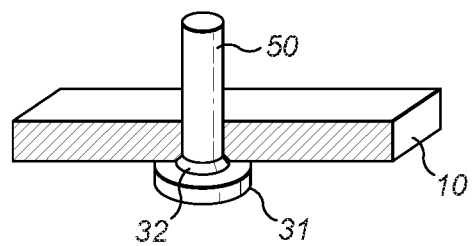
FIG. 5b shows a cut-away view of the fastener in a chamfered hole of the plate.
Figure 5C:
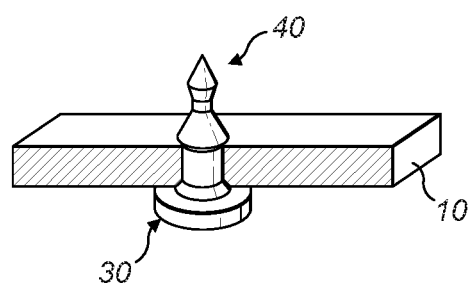
FIG. 5c shows a cut-away view of the fastener with a shaped tail.

In Figure set 4, the hole 11 is provided with a chamfer 13 on the bottom surface of the plate 10 (see FIG. 4a). The head 30 is shaped (see FIG. 4b) so as to have a matching chamfered portion 32 (instead of the disc 31). The chamfered portion 32 of the head 30 sits in the chamfer 13 on the hole 11 and allows the head to be counter sunk to give a flush bottom surface of the plate 10. (FIGS. 4a to 4d effectively replace FIGS. 1a, 1c, 1d and 1e, respectively—steps 1, 3, 4 and 5.)

In Figure set 5, the head 30 is shaped so as to have a similar (to FIG. 4b) matching chamfered portion 32 on top of the disc 31. The chamfered portion 32 of the head 30 sits in the chamfer 13 on the hole 11 and allows the chamfered portion 32 of the head to be counter sunk. The disc 31 may be removed afterwards to give a flush bottom surface of the plate 10. (FIGS. 4a and 5a to 5c effectively replace FIGS. 1a, 1c, 1d and 1e, respectively —steps 1, 3, 4 and 5.)

Figure 6A:
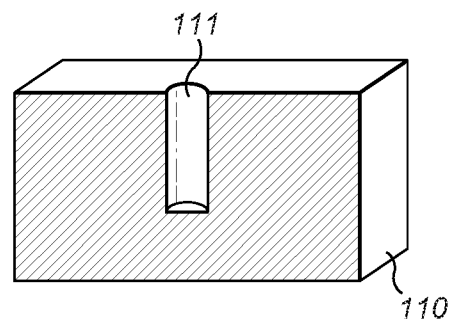
FIG. 6a shows a cut-away view of a non-through hole in a metallic component for forming a metallic-composite joint according to another embodiment of the invention.
Figure 6B:
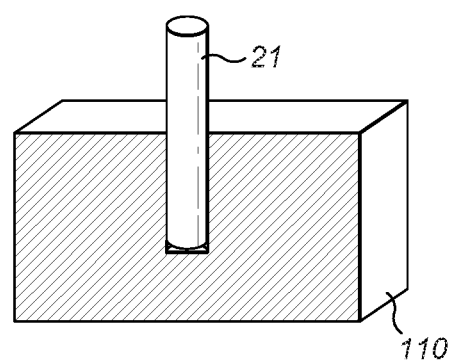
FIG. 6b shows a cut-away view of a fastener interference fitted in the hole.
Figure 6C:
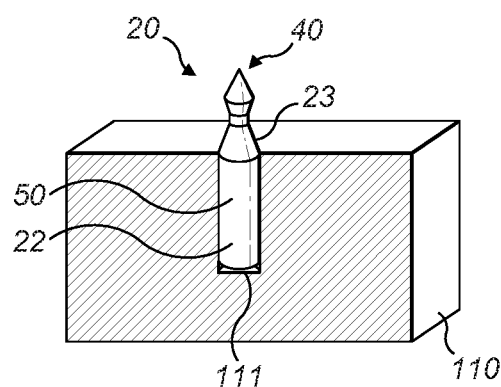
FIG. 6c shows a cut-away view of the fastener with a shaped tail.

In Figure set 6, the metallic (aluminium alloy) component 110 is not a plate. In addition, the hole 111 is not a through-hole. Here, the fastener 20 made out of wire 21 is a larger diameter than the hole 11 and is put into the hole with an interference fit. There is no shaped head 30. After the head portion 22 is attached in the hole 111, the shaped tail 40 is formed, as before. (FIGS. 6a to 6c effectively replace FIGS. 1a to 1e, respectively—steps 1, 4 and 5 (no step 3).)

Figure 7:
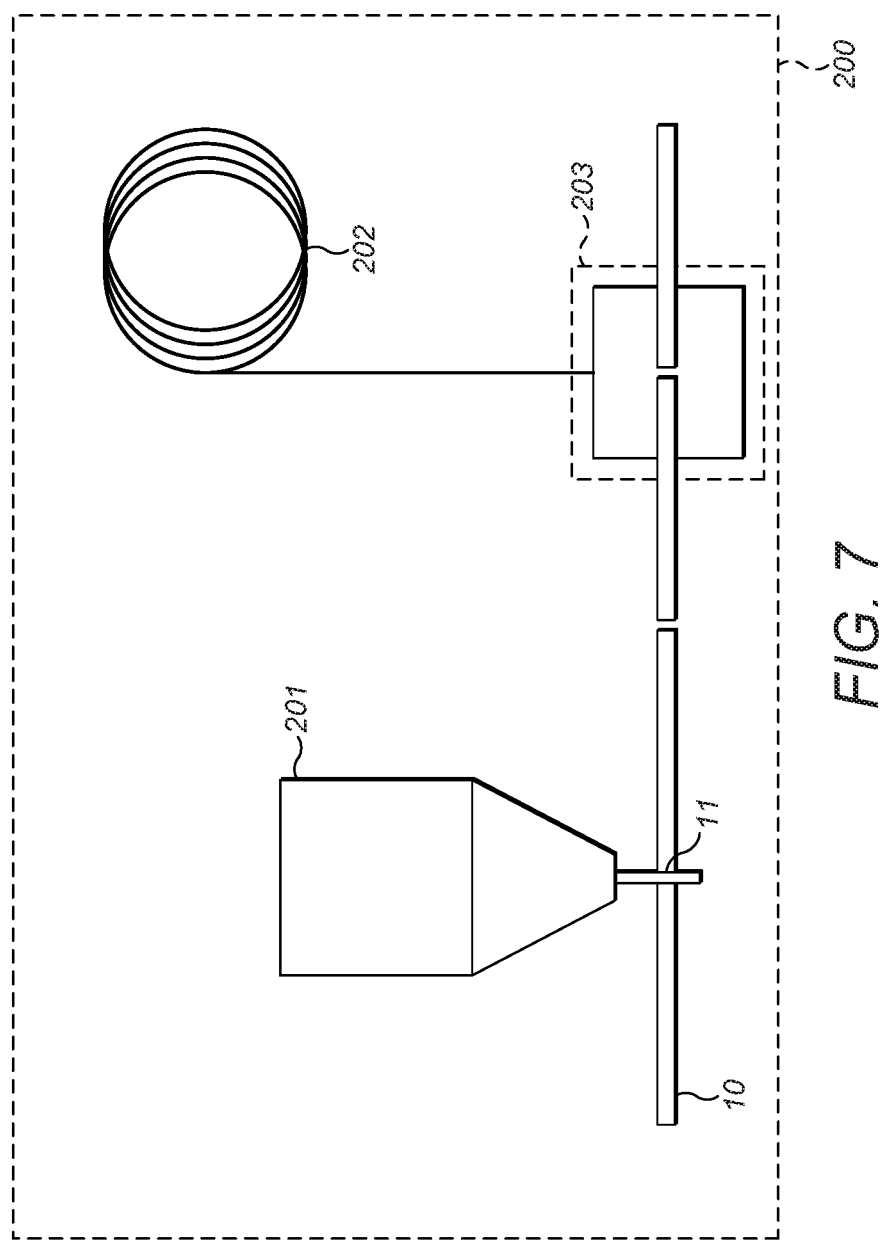
FIG. 7 shows the equipment used to form the various joints.

FIG. 7 shows the equipment used to form the various joints of the Figure sets. The equipment 200 includes a drill 201 (for drilling and chamfering holes 11, 111 in the plate 10 or component 110) and a wire feed 202 for supplying the wire 21 to make the fasteners 20. The fasteners are formed in the forming apparatus 203.

Figure 8A:
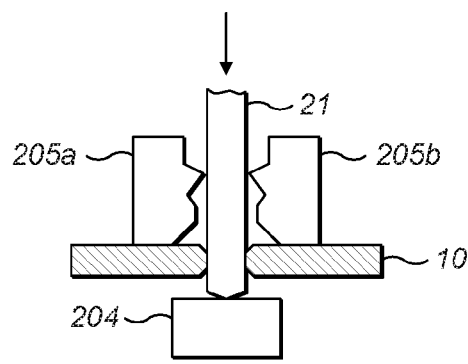
FIG. 8a shows a wire being stopped by the equipment.
Figure 8B:
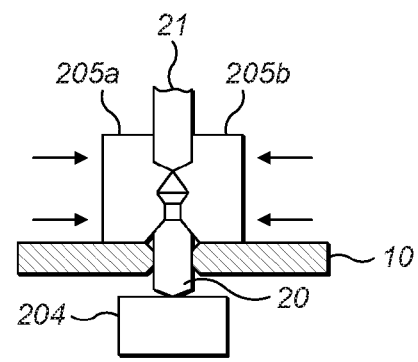
FIG. 8b shows the wire being gripped by the equipment.

FIGS. 8a to 8d show the processes which might happen in the forming apparatus 203. Firstly, the wire 21 of the wire feed 202 is fed through a hole in a plate 10 and stopped by a stopper (rivet head) 204 (FIG. 8a). After it is stopped, the wire 21 is squeezed by a two part gripping die 205a, 205b (FIG. 8b) to form the shaped tail 40 of the fastener 20. The dies 205a, 205b also cuts the wire 21 above the tail.

Figure 8C:
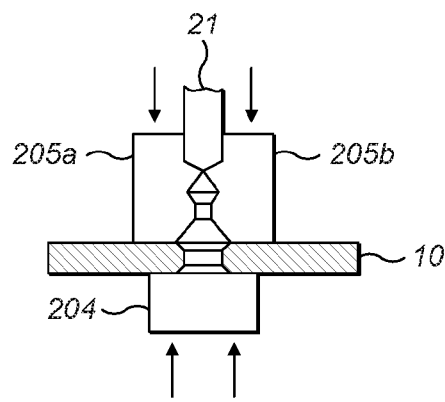
FIG. 8c shows the wire being punched by the equipment.
Figure 8D:
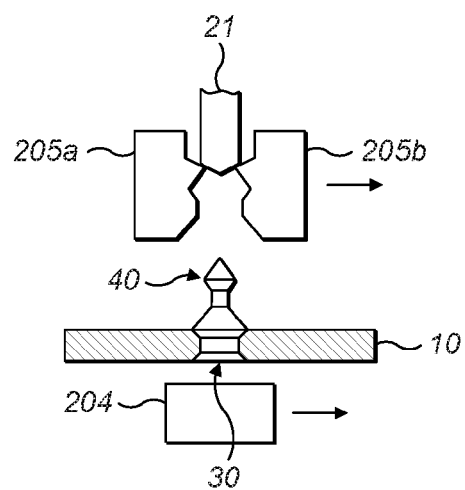
FIG. 8d shows the finished fastener in a plate.
Figure 9:
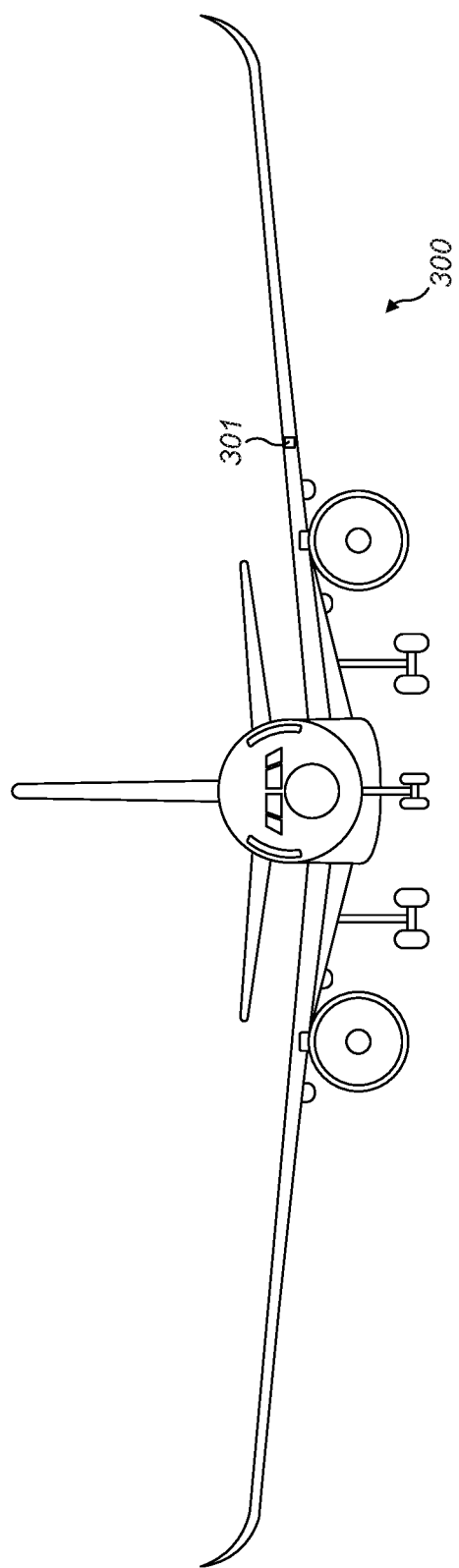
FIG. 9 shows an aircraft including at least one metallic-composite joint.

The gripping die 205a, 205b is then pushed down to the plate 10 and the stopper 204 is pushed up to the plate 10 to form the head 30 of the fastener 20 (FIG. 8c). Finally, the stopper 204 and gripping die 205a, 205b are removed (along with the cut wire 21) to another hole in the plate, leaving the fastener 20 in the hole in the plate 10 (FIG. 8d), FIG. 9 shows an aircraft 300 including at least one metallic-composite joint 301, which has been manufactured by one of the methods described above.

Whilst the present invention has been described and illustrated with reference to particular embodiments, it will be appreciated by those of ordinary skill in the art that the invention lends itself to many different variations not specifically illustrated herein. By way, of example only, certain possible variations will now be described.

The metallic component 10, 110 could be any shape or configuration. For example, it could be a plate, butt strap, stiffener, cleat, bracket, flange or tubular end fitting, for example. The metallic component may be generally planar, curved or non-planar, for example.

The joint may or may not be part of an aircraft. For example, the joint may be for use in sports equipment, such as a bike, a boat hull or a wind turbine blade.

The shaped head 30 and/or shaped tail 40 may take any suitable shape, including the lip 45 of the tail 40 and the chamfered portion 32 of the head 30.

The shaped head 30 and/or shaped tail 40 may be shaped using compressive forming techniques, reciprocal or rotating cylindrical methods.

The head 30 may not be shaped. This could be the case where an interference fit (in a through hole or a non-through hole) is used.

The tail may not be shaped. This could he the case where the arranging of the layered fibres comprises the step of for each layer, laying up the fibres on the metallic component such that two adjacent fibres pass on substantially opposite sides of the tail portion of the metallic fastener so that the tail portion extends through the layer.

The composite component is not necessarily placed directly on the metallic component 10, 110 surface. For example, it is noted that, in order to prevent the, for example, carbon fibres of the composite component being adjacent the aluminium alloy or other material) metallic component, a glass layer can be used in between the composite component and the metallic component. The glass layer may be integral with the (cured) composite component.

The hole 11, 111 in the metallic component 10, 110 may be provided before, during or after the cutting of the wire 21 or the shaping of the head 30 and/or tail 40 of the fastener 20, as appropriate.

Other materials may be used for the metallic component 10, 110 and/or fastener 20.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of manufacturing a metallic-composite joint, the metallic-composite joint comprising:
   a metallic component, the metallic component having at least one hole in a surface thereof, and
   a metallic fastener, the metallic fastener having a head portion for attaching to the metallic component and a tail portion for attaching to a composite component,
   the method of manufacturing a metallic-composite joint comprising the steps of:
   positioning the metallic fastener such that:
   at least a part of the head portion of the metallic fastener is retained in the hole of the metallic component, and
   the tail portion of the metallic fastener extends out of the hole and away from the surface of the metallic component,
   arranging layered fibres of an uncured composite component on the surface of the metallic component, after positioning the metallic fastener through the hole in the metallic component, such that the tail portion extends through a gap between adjacent fibres in each fibre layer of the arranged layered fibres prior to curing of the composite component, and
   curing the composite component, thereby attaching the composite component to the tail portion of the metallic fastener.

2. A method of manufacturing a metallic-composite joint as claimed in claim 1, wherein the arranging of the layered fibres comprises the steps of:
   laying up the fibres in layers, then
   positioning the layers adjacent an end of the tail portion distal from the surface of the metallic component, and then
   shaking the layers so that the tail portion to passes through the gap in each layer.

3. A method of manufacturing a metallic-composite joint as claimed in claim 1, wherein the arranging of the layered fibres comprises the step of:
for each layer, laying up the fibres on the metallic component such that two adjacent fibres pass on substantially opposite sides of the tail portion of the metallic fastener so that the tail portion extends through the layer.

4. A method of manufacturing a metallic-composite joint as claimed in claim 1, wherein either the method further comprises the step of shaping the tail portion or the tail portion of the metallic fastener has already been shaped.

5. A method of manufacturing a metallic-composite joint as claimed in claim 4, wherein the tail portion is or has been shaped to have:
an outer region, towards the end of the tail portion furthest away from the head portion, and
an inner region, towards the end of the tail portion nearest the head portion, wherein the cross-section at the outer region is larger than at the inner region.

6. A method of manufacturing a metallic-composite joint as claimed in claim 5, wherein the tail portion is or has been shaped to have an intermediate region, in between the inner and outer regions, with a cross-section smaller than the inner region.

7. A method of manufacturing a metallic-composite joint as claimed in claim 4, wherein the tail portion is or has been shaped so that the end of the tail portion furthest away from the head portion is tapered.

8. A method of manufacturing a metallic-composite joint as claimed in claim 1, wherein either the method further comprises the step of shaping the head portion or the head portion of the metallic fastener has already been shaped.

9. A method of manufacturing a metallic-composite joint as claimed in claim 8, wherein the head portion is or has been shaped to have:
an outer region, towards the end of the head portion furthest away from the tail portion,
an inner region, towards the end of the head portion nearest the tail portion, wherein the cross-section at the outer region is larger than at the inner region.

10. A method of manufacturing a metallic-composite joint as claimed in claim 9, wherein the outer region of the head portion is or has been chamfered to correspond to a chamfered region of the hole in the metallic component.

11. A method of manufacturing a metallic-composite joint as claimed in claim 1, wherein, after the metallic fastener is positioned in the hole of the metallic component, the metallic fastener is shaped to have a securing lip at a junction of the head portion and tail portion, for securing the head portion in the hole.

12. A method of manufacturing a metallic-composite joint as claimed in claim 11, wherein the metallic component has a correspondingly shaped recess to accommodate the securing lip.

13. A method of manufacturing a metallic-composite joint as claimed in claim 1, wherein the head portion of the metallic fastener is retained in the hole of the metallic component at least partially by an interference fit.

14. A method of manufacturing a metallic-composite joint as claimed in claim 1, wherein the hole in the metallic component is a through-hole extending through a thickness of the metallic component.

15. A method of manufacturing a metallic-composite joint as claimed in claim 1, wherein the method further includes the step of cutting a wire feed stock to form the metallic fastener.

16. A method of manufacturing a fastener assembly, the fastener assembly comprising:
a metallic component, the metallic component having at least one hole in a surface thereof, and
a metallic fastener, the metallic fastener having a head portion for attaching to the metallic component and a tail portion for attaching to a composite component, the method comprising the steps of:
positioning the metallic fastener such that:
at least a part of the head portion of the metallic fastener is retained in the hole of the metallic component, and
the tail portion of the metallic fastener extends out of the hole and away from the surface of the metallic component,
the method comprises arranging layered fibres of an uncured composite material on the surface of the metallic component, after positioning the metallic fastener through the hole in the metallic component, such that the tail portion extends through a gap between adjacent fibres in each fibre layer of the arranged layered fibres prior to curing of the composite material;
curing the composite material, thereby attaching the composite component to the tail portion of the metallic fastener, and
wherein either the method further comprises the step of shaping the tail portion or the tail portion of the metallic fastener has already been shaped.

17. A method of manufacturing a fastener assembly as claimed in claim 16, wherein the tail portion is or has been shaped to have:
an outer region, towards the end of the tail portion furthest away from the head portion, and
an inner region, towards the end of the tail portion nearest the head portion, wherein the cross-section at the outer region is larger than at the inner region.

18. A method of manufacturing a fastener assembly as claimed in claim 17, wherein the tail portion is or has been shaped to have an intermediate region, in between the inner and outer regions, with a cross-section smaller than the inner region.

19. A method of manufacturing a fastener assembly as claimed in claim 16, wherein the tail portion is or has been shaped so that the end of the tail portion furthest away from the head portion is tapered.

* * * * *